United States Patent [19]

Lang et al.

[11] Patent Number: 5,175,131
[45] Date of Patent: Dec. 29, 1992

[54] PLANT SUBSTRATE AND USES THEREOF

[75] Inventors: Rüdiger Lang, Vlotho, Fed. Rep. of Germany; Jürgen Tönne, St. Cyr en Val, France; Klaus Czempik, Verden/Aller, Fed. Rep. of Germany

[73] Assignee: EFFEM GmbH, Verden/Aller, Fed. Rep. of Germany

[21] Appl. No.: 466,302

[22] PCT Filed: Aug. 12, 1988

[86] PCT No.: PCT/DE88/00491
§ 371 Date: Jun. 12, 1990
§ 102(e) Date: Jun. 12, 1990

[87] PCT Pub. No.: WO90/01259
PCT Pub. Date: Feb. 22, 1990

[51] Int. Cl.⁵ ............................................. C04B 38/10
[52] U.S. Cl. ....................................... 501/84; 71/900; 71/904; 47/9
[58] Field of Search ....................... 71/900, 61, 62, 63; 501/84; 47/9, 62, 64, 65

[56] References Cited

U.S. PATENT DOCUMENTS 4,168,962  9/1979  Lambeth ........................... 71/900 X

FOREIGN PATENT DOCUMENTS 3936185  11/1985  Australia .

Primary Examiner—Ferris Lander
Attorney, Agent, or Firm—Curtis, Morris & Safford

[57] ABSTRACT

A plant substrate, characterizd by the fact that it contains 20 to 100% of a granulate consisting of foamed clays or weakly fired ceramic materials, and uses thereof.

1 Claim, No Drawings

PLANT SUBSTRATE AND USES THEREOF

BACKGROUND OF THE INVENTION

The present invention relates to a plant substrate containing 20 to 100% of a granulate of foamed clays or lightly fired ceramic materials, as well as the uses thereof.

Plant metabolism is characterized essentially by the following processes dissimilation (respiration), assimilation (photosynthesis), nutrient exchange, water economy and transpiration. For optimum growth, the plant requires, in addition to atmospheric influences (climate, light, etc.), a fixed support and a continuous and sufficient supply of nutrients and water from its substrate. Composition and structure of the substrate are therefore essential growth factors.

Plant organisms require water not only as a starting compound for photosynthesis but also as an important reaction partner in metabolic processes. Accordingly, the water content of the organisms is high: the percentage by weight of water may amount to up to 90% or more of the living substance of higher plants. A continuous flow of water takes place in the plants, the water being driven into the upper parts of the plants by permanent evaporation (transpiration). This loss of water must be compensated for by a corresponding absorption of water. Plant organisms can basically employ their entire surface for the absorption of water. Plants which have a root, however, supply themselves from the substrate.

The absorption of nutrients is, to a great part, bound to water, since the mineral substances and, in part, also the organic substances are absorbed in aqueous solution. In addition to carbon, oxygen and hydrogen, which are incorporated in organic molecules upon photosynthesis starting from $CO_2$ and $H_2O$, plants require further elements for their metabolism, namely nitrogen, sulfur and phosphorus as non-metals, as well as the metals potassium, calcium and magnesium. Furthermore, for their normal development, most plants also require trace elements, namely iron, manganese, zinc, copper, boron, molybdenum, cobalt as well as chlorine and silicon, and in some cases also sodium and selenium. Almost all of said elements are considered essential; with an insufficient supply, typical deficiency phenomena occur. For many plants, the presence of all essential elements in the soil is not sufficient. Rather, their amounts must also be in a favorable ratio to each other. Furthermore, the manner in which the nutrients are bound to the substrate, and thus their availability, constitutes a critical variable supplying the nutrients to the plant.

The well-being of the plant is therefore dependent to a great extent on physical and chemical properties of the substrate. Important physical parameters include the volume of the soil, the exchange capacity of the substrate, which is dependent on its mineralogical composition, its particle size and structure, as well as the stability of the substrate structure, which is affected by various factors. The contents of organic substances such as growth, humin, inhibiting and resistance substances, etc., and of the aforementioned essential elements from inorganic substances represent the decisive chemical parameters of the substrate.

Formerly, numerous different mixtures of earth were used as plant substrates in order to satisfy the different requirements of different plants. During the last few decades, use has been made in actual practice of various standard earths and peat substrates whose water and nutrient content can be easily controlled. In addition to this, there has been increased use recently, particularly in care of house plants, of hydroponics in which the nutrients must be fed in plant-available form by watering solutions to the substrate. The substrate generally consists of expanded clay granulate. In this case, the substrate is produced by firing suitable clays at very high temperatures, and the material is expanded, i.e. irregular blisters and pores are formed, by an inner development of gas.

OBJECTS OF THE INVENTION

The object of the present invention is to provide a plant substrate which has definitely improved physical and chemical properties as compared with the prior art plant substrates. These properties can be adapted to the requirements of the specific plants in a simple and effective manner.

SUMMARY OF THE INVENTION

In accordance with the invention, this object is achieved by a plant substrate of the aforementioned type which is characterized by a content of 20 to 100% of a granulate consisting of expanded clays or slightly fired ceramic materials.

DETAILED DESCRIPTION OF THE PREFERRED EMBODIMENTS

The plant substrate is preferably produced by a method in which 45 to 80 parts weight by clay, 0 to 50 parts by weight of calcite, quartz sand, dolomite, feldspar, fire clay and sepiolite as addition substances, 15 to 30 parts by weight of water, 0.01 to 0.03 parts by weight of a liquefaction agent, (e.g., sodium polyphosphate) and 0.001 to 0.01 parts by weight of surfactant, (e.g., sodium dodecyl sulfonate) are mixed and foamed in a known dispersion installation under pressure (1 to 10 bar) by feeding compressed air at a temperature between room temperature and 95° C. Agents which counteract the liquefaction agent (e.g., mineral acids such as hydrochloric acid and sulfuric acid) may be added in order to produce a highly viscous thixotropic, inherently stable foam suspension. The foamed mixture may be shaped into shaped clay bodies and dried at a temperature between room temperature and 200° C. The dried alumina-shaped bodies may be comminuted and screened, with return of the fines to the initial mixture. Finally, the shaped clay bodies or the comminuted shaped clay bodies of selected particle-size range are fired at a product temperature in the shaped clay body of between 600° and 1500° C., and preferably between 700° and 800° C.

The essential features of such a method are described in Federal Republic of Germany Patent 34 14 965, in which 0.01 to 0.3 parts by weight of liquefaction agent are preferably provided and the firing temperature is preferably limited to at most 1000° C. By way of further explanation of the aforementioned method which is used in the preferred production of the plant substrate of the invention, reference is had accordingly to Federal Republic of Germany Patent 34 14 965.

In one embodiment of the invention, the foaming of the initial mixture is effected at a gage pressure of at least 0.3 bar. The pressure is maintained until the exiting from the nozzle.

The shaping and comminution of the shaped clay bodies can also be effected by periodic interruption from extruded strands of the foamed mixture.

It can also be provided, in accordance with the invention, that a range of 1 to 5 mm granulate diameter is selected as particle size.

Another embodiment of the invention provides that the granulate has the following particle-size composition: 15 to 30% by weight, and preferably 25% by weight, of granulate having a diameter of 1 to 2 mm; 40 to 70% by weight, and preferably 60% by weight, of granulate having a diameter of 2 to 4 mm; and 5 to 20% by weight, and preferably 15% by weight, of granulate having a diameter of 4 to 5 mm.

The invention, furthermore, also proposes that the pore diameter of the granulate be less than 1 mm.

Furthermore, according to the invention, the use of the plant granulate of the invention is proposed as material for hydroponics.

Furthermore, the invention is directed to the use of the plant substrate of the invention as addition to potting soil.

Another embodiment of the invention contemplates the use of the plant substrate of the invention as a depot vehicle for nutrients, fertilizers and/or pesticides.

In that case the porous ceramic material can be sprayed with a solution of active substances.

Furthermore, the sprayed porous ceramic material may be coated with a solution which initially hardens but then loosens up under the action of water and root juices, within predetermined periods of time.

Also, waterglass solutions of different compositions may be used as coating solutions. The waterglass is often previously reacted with lime, chalk or gypsum.

The invention also teaches the use of the plant substrate of the invention as a long-term buffer for use in overacidified soils.

In that case, materials such as chalk, dolomite or the like which form alkaline silicates upon firing preferably are added to the initial mixture.

Another embodiment of the invention is directed to the use of the plant substrate of the invention as a bottom covering in aquariums.

By the use in accordance with the invention of granulates consisting of foamed clay or ceramic materials, and particularly those which have been produced by a method such as described in Federal Republic of Germany Patent 34 14 965, a completely new type of plant substrate is obtained. This material, referred to herein below as "foamed clay granulate", can be used both as hydroponics material and as addition to potting soils. In the latter case, both mixing with the potting soil and arrangement in layers is possible.

The essential elements which are necessary for the supplying of the plant, which have already been enumerated above, are present in the starting material and are made available in the product in a form which is available for the plant. For plants with additional requirements, (for instance, additional requirement of phosphorus for blossoming in the case of blossoming plants) the formula is supplemented by suitable additives, or corresponding clays are added. Thus products which are optimal for each case of use can be prepared.

By the particle-size composition of the foamed clay granulate contemplated in the invention, a granulate bulk is obtained which has both optimal liquid transport and liquid exchange in the granulate and sufficient air permeability in order to make the required gaseous exchange possible. Both of these are requirements for optimal plant maintenance.

By the pore size within the range of less than 1 mm, the plant is enabled to penetrate by the tips of its roots into the granulate and to absorb substances from the smaller pores via the root hairs.

The high inherent stability of the material assures an aggregate structure which provides optimum exchange of air, (oxygen supply) for very long periods of time. This is extremely important for the maintenance of the plants and in order to prevent disease, for instance.

By the uniform structure of the material, and particularly the optimally adjustable structure as a result of the above-indicated method, and the capillary forces of the material, the liquid present is always uniformly distributed within a unit, and thus made available at every place. Too large or too small a supply of liquid is thereby prevented. In this way, toxic concentrations of the nutrient solution as a result of local drying can be avoided. Only rarely can this be assured when using traditional potting soils.

In connection with the further uses of the foamed alumina granulate as depot support, long-term buffer or bottom covering for aquariums, in accordance with the invention, its advantages also result primarily from the uniform structure of the material and its capillary forces. As a result, the availability of the substances which are decisive for the specific purpose of use can be foreseen and controlled.

Particularly advantages is the manner of producing the granulate for the plant substrate in accordance with the invention, which is described essentially in Federal Republic of Germany Patent 34 14 965, already indicated above. This method completely avoids additional solidifying or binding agents such as cement, since they may contain substances which are undesired for the new fields of use of the material, such as, for example, calcium, phosphates, etc. The foaming of the initial mixture should take place here at at least 0.3 bar, with a maintained gage pressure until emergence from the nozzle since movement of the foamed mass is carried out under pressure. As soon as the pressure is absent, the "free" portion of water decreases, and movement in the material would lead to the destruction of the pore structure.

The procedure which is proposed in Federal Republic of Germany Patent 34 14 965 can, as already mentioned above, also be modified so that instead of shaping the foamed mixture into clay shaped bodies and drying and comminuting them, extruded strands of the foam mixture are periodically interrupted. As a result, the direct production of granulate is possible and subsequent comminution is no longer required.

The invention is further explained below with reference to a specific example.

EXAMPLE 500 grams of brick clay are introduced together with 200 liters of water, 400 kg of diatomaceous earth, 80 g of sodium polyphosphate, 100 g of sodium dodecylsulphonate and 5 kg of recycled foamed clay fines into a mixer and mixed vigorously for about 5 minutes at about 2 bar. The resultant highly thixotropic clay suspension is introduced into a molding installation and brought in strands of a diameter of 1 cm into a drum drier. The drum drier, which was preheated to 200° C., conducts the foamed clay material, after a drying time of 5 minutes, into a roll crusher. The dried foamed clay material is broken up within the roll crusher; the comminuted foamed clay particles are then separated in a screening installation into a grain fraction of sizes between 2.5 and 4 mm which is brought to the firing oven. The grain fraction having grain sizes of less than 2.5 mm is fed back to the initial mixture. The dried foamed clay particles which are conducted to the firing are conducted into a continuously operating kiln heated to 1450° C. and fired there with a dwell time of 4 minutes. The fired ceramic product is worked into a granulate which can be used directly as plant substrate. The pH is 7.2, the water absorption power about 130 wt. %, the internal surface about 180 m$^2$/g., and the pore diameter 0.8 mm.

The terms and expressions which have been employed are used as terms of description and not of limitation, and there is no intention in the use of such terms or expressions to excluding any equivalents of the features shown and described or portions thereof, it being recognized that various modifications are possible within the scope of the invention.

We claim:

1. A process for the production of a porous ceramic granulate, for use as a plant substrate, with uniform pore structure, a pore size of less than 1 mm, and an inner surface area of about 180 m$^2$/g. comprising mixing 45 to 80 parts by weight of clay, 0 to 50 parts by weight of an addition substance selected from the group consisting of calcite, quartz sand, dolomite, feldspar, fire clay, sepiolite and mixtures thereof, 15 to 30 parts by weight of water, 0.01 to 0.03 parts by weight of a liquefaction agent and 0.001 to 0.01 parts by weight of a surfactant, and foaming these substances in a dispersing installation under an over-pressure of 1.0 to 10 bar, by feeding compressed air at a temperature between room temperature and 95° C. and maintaining the foaming pressure until emergence from a nozzle producing strands from the foamed mixture; if desired, adding agents counteracting the liquefaction agent in order to produce a highly viscous, thixotropic, inherently stable foam suspension; shaping the foamed mixture into clay shaped bodies, and drying the clay shaped bodies at a temperature between room temperature and 200° C.; if desired, comminuting and screening the dried clay shaped bodies; returning the fines to the initial mixture; and finally firing the clay shaped bodies, or the comminuted clay shaped bodies, with selected particle-size range, at a product temperature within the clay shaped body of between 600° and 1500° C.

* * * * *